United States Patent [19]

Snow et al.

[11] Patent Number: 5,039,193

[45] Date of Patent: Aug. 13, 1991

[54] FIBRE OPTIC SINGLE MODE ROTARY JOINT

[75] Inventors: James W. Snow, Bedford; Graham A. J. Smith, Armdale; Geoffrey H. Channer, Halifax; John W. Purdy, Dartmouth, all of Canada

[73] Assignee: Focal Technologies Incorporated, Dartmouth, Canada

[21] Appl. No.: 505,355

[22] Filed: Apr. 3, 1990

[51] Int. Cl.$^5$ .............................. G02B 6/32; G02B 6/26
[52] U.S. Cl. ........................................... 385/25; 385/33
[58] Field of Search ............... 350/96.10, 96.15, 96.16, 350/96.18, 96.20, 96.21, 96.22; 250/227.11

[56] References Cited

U.S. PATENT DOCUMENTS

| | | | |
|---|---|---|---|
| 4,303,330 | 12/1981 | Pressiat et al. | 350/96.20 |
| 4,398,791 | 8/1983 | Dorsey | 350/96.18 |
| 4,472,052 | 9/1984 | Lofgren | 350/96.20 |
| 4,641,915 | 2/1987 | Asakawa et al. | 350/96.18 |
| 4,643,521 | 12/1987 | Harstead et al. | 350/96.20 |
| 4,725,116 | 2/1988 | Spencer et al. | 350/96.20 |
| 4,961,622 | 10/1990 | Gorman et al. | 350/96.18 |

OTHER PUBLICATIONS

Presby, H. M. et al, "Research on an expanded beam single-mode fiber-optic connector"; Applied Optics, vol. 27, No. 15; Aug. 1, 1988.

Marcuse, D., "Loss Analysis of Single-Mode Fiber Splices", The Bell System Technical Journal, vol. 56, No. 5, May-Jun. 1977; pp. 703-719.

Presby, H. M. et al, "Optical Fiber-Up Tapers with High Beam Expansion Ratios for Component Fabrication"; Journal of Lightwave Technology vol. 7, No. 5, May 1989; pp. 820-823.

Amitay, N., et al; "Optical Fiber Up≧Tapers Modeling and Performance Analysis"; Journal of Lightwave Technology, vol. 7, No. 1, Jan. 1989.

Harper, J. S. et al, "Single-mode core-diffused tapers for interconnection components"; SPIE vol. 988 Components for Fiber Optic Applications and Coherent Lightwave Communications (1988); pp. 209-212.

*Primary Examiner*—Brian Healy
*Attorney, Agent, or Firm*—Jones, Tullar & Cooper

[57] ABSTRACT

The invention is a rotary joint for singlemode optical fibers, having a fixed and a rotating part to permit the transmission of optical signals across a rotational interface (such as a winch or turret) with minimal insertion loss and, in particular, low reflections (good return loss). There is no need of conversion to electrical signals; the device is passive. It may be use an oil of refractive index matched to that of the glass fibers and to that of fiber tapers or lenses used to expand the beam emitted from one fiber and contract it for transmission into the other fiber. The device is bidirectional. By use foil, through precision techniques for building and mounting the optical and mechanical components, and by use of advanced bearings, both the insertion loss and unwanted reflections (return loss) can be minimized, thereby making it suitable for use with singlemode fiber. Insertion loss can be further reduced in conjunction with index-matching fluid by using optical elements (lenses, tapers, fibers) having angled or curved facets rather than perpendicular facets. Oil filling has the further advantage of pressure compensation allowing the device to operate at any ambient pressure. Lenses having curved surfaces can be accommodated by the use of fluid having a refractive index different from that of the lens material.

22 Claims, 4 Drawing Sheets

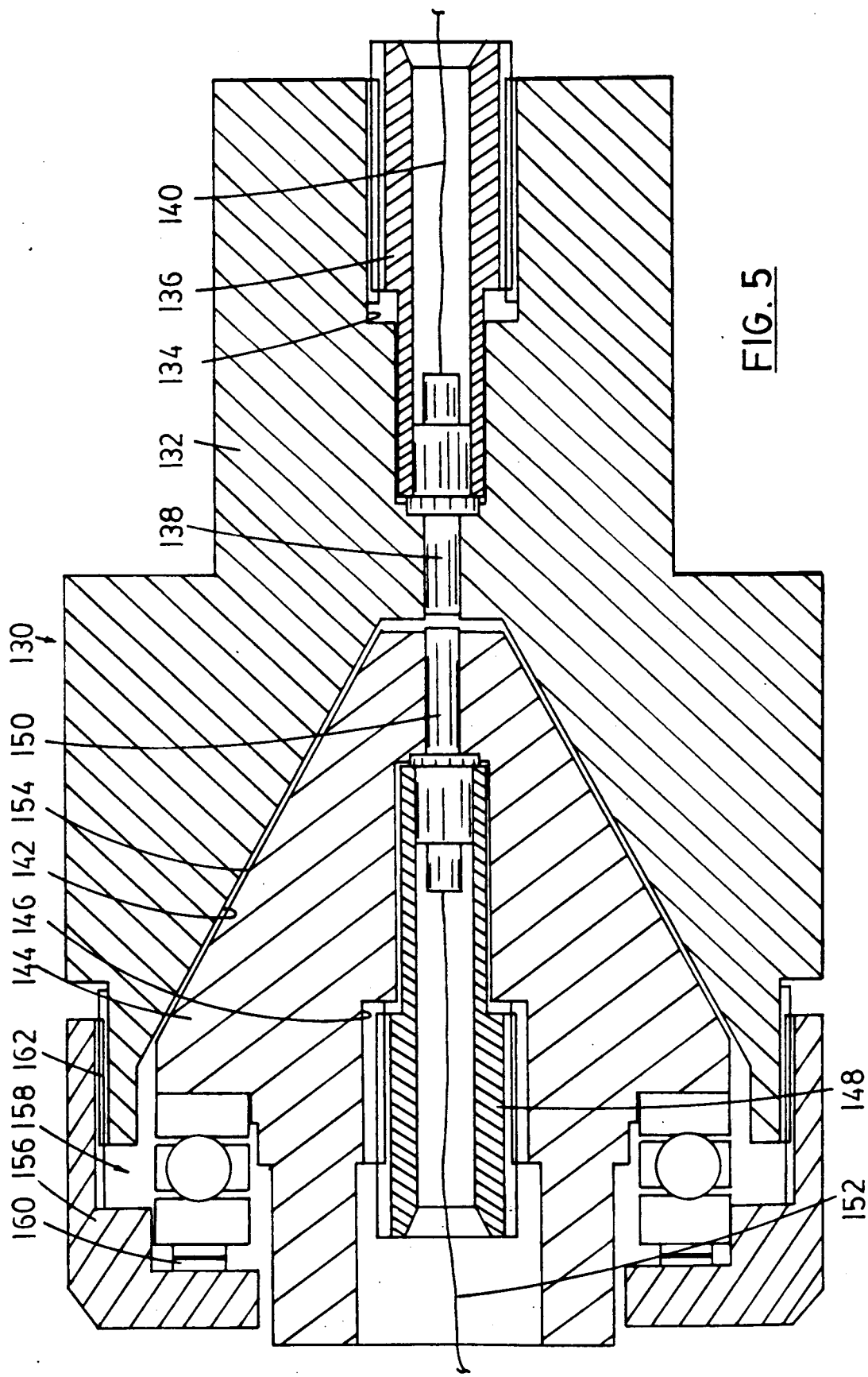

FIBRE OPTIC SINGLE MODE ROTARY JOINT

The present invention relates to fiber optic rotary joints (FORJ's) in general and to structural improvements which minimize optical losses across the optical interface.

BACKGROUND OF THE INVENTION

The properties of optical fiber make it an ideal medium for carrying signals in an ever-increasing number of applications. These properties include high bandwidth, i.e. signal carrying capacity, immunity to interference, low loss, light weight and low bulk. Optical fiber is often used in conjunction with electrical leads for carrying power, in applications such as underwater sensor arrays and remotely operated vehicles for pipeline inspection and repair. In such applications the composite cable is winched from the surface vessel. This requires a slip ring or rotary joint assembly at the winch, to permit the payout or retraction of cable while allowing continuous operation of the underwater system.

Electrical slip rings for the copper wires carrying power are well established, but fiber optic rotary joints are much more recent developments and have not been perfected to an adequate state for many applications. In some systems, wherein optical fiber has been used for signal telemetry, it was necessary to convert the optical signals to electrical signals within the winch drum, thereby losing some of the benefits of fiber optics through exposure to interference as well as introducing failure-prone and expensive components.

The use of fiber optic rotary joints has been limited by their performance. The few fiber optic rotary joints that have been reported have losses of typically 3 dB for insertion loss and −20 to −25 dB for return loss. These figures, which are for multimode fiber, are inadequate for some applications; more importantly, they are unacceptable for use with laser based singlemode fiber systems. Singlemode fiber of the type used in long-haul telecommunications is increasingly chosen for short-haul applications such as those given above, to capitalize on its higher bandwidth, lower loss and other advantages.

Oil-filling has been mentioned in other disclosures (U.S. Pat. No. 4,725,116) but not in the context of reducing return loss to permit singlemode operation.

The invention described herein gives several improvements in the state of the art of fiber optic rotary joint technology, accommodating many applications which were previously not satisfactorily addressed.

SUMMARY OF THE INVENTION

The present invention provides a rotary joint for optical fibers without the need to convert to electrical signals. It is designed for use with singlemode fiber but can also be used with the less difficult case of multimode fiber. In particular the return loss performance is improved over previously reported rotary joints, and the devices can be operated at any ambient pressure. To achieve these results, an object of the present invention is to provide a rotary assembly wherein a subassembly containing one optical fiber is made rotatable on the same axis as, and in relation to, a subassembly containing a second optical fiber, and a subsystem for transmission of light from either fiber to the other with minimal loss, including an optically clear oil. The light transmission system between the fibers may include lenses of several types. The refractive index of the oil may be matched to that of the lenses or may be different depending on the type of lenses used. The presence of the oil has the added advantage of providing pressure compensation, so that the device can be operated at any water depth. Procedures are presented for the precision (sub-micron) alignment of the optical parts and machining of the mechanical parts, to achieve the control over dimensions that is required to provide good loss performance with singlemode fiber.

Another object of the invention is to provide a rotary joint wherein optical fiber tapers are used to expand the beam from one fiber and subsequently contract it into the other, thereby achieving, without the use of lenses, a reduction in optical losses associated with dimensional variations. By deleting the fiber to lens interface, this also gives improved return loss, especially with an index-matching fluid between the faces.

Still another object of the invention is to incorporate tapered bearings and precision sleeve bearings for the rotating assembly, to achieve reduced optical losses through improved concentricity between the rotating and stationary assemblies.

BRIEF DESCRIPTION OF THE DRAWINGS

FIG. 2 (b) suggests the loss associated with lateral misalignment of the fibers. These losses are graphed in FIG. 6.

FIG. 3 (b) shows the same in the spherical lenses, and FIG. 3 (c) in double convex lenses.

FIG. 4 (b) shows aspheric lenses achieving beam expansion and collimation; FIG. 4 (c) shows a fiber and lens with angled facets; FIG. 4 (d) shows rod lenses with angled facets; FIG. 4 (e) shows rod lenses with curved facets.

FIG. 5 shows an embodiment of the invention incorporating plain tapered bearings for the rotary assembly, for improved concentricity and, thereby, reduced optical loss and reduced variation of loss with angular position.

FIG. 6 (b) shows the loss associated with lateral misalignment.

FIG. 7 shows a setup for achieving precision mounting of lenses in ferrules, essential to achieve good performance with singlemode components.

DETAILED DESCRIPTION OF THE INVENTION

OIL FILLING

A common type of optical loss in fiber optic telemetry systems is Fresnel reflection (return) loss, caused by the difference between the refractive index of the fibers ($n_1$) and that of the material separating them ($n_0$). This loss is critical in many applications in that it not only reduces the intensity of the light signal reaching the destination (the receiver), but it also causes unwanted reflections which can degrade performance (such as digital bit error rate) or generate crosstalk between channels. Reflections are caused by any refractive index discontinuity along the optical link, including splices and connectors.

Reflections are particularly problematic in singlemode fiber optical systems, which generally employ laser sources to launch sufficient power into the fiber. Reflected light from components (such as connectors, splices, couplers and filters) along a lightwave link can strike the laser source, forming optical feedback that usually degrades the laser's performance. It increases output power fluctuation, pulse distortion and phase noise, and it can change the laser's wavelength, line width and threshold current. Furthermore, these effects might be partially random because of unstable reflections, and therefore result in output power fluctuation and laser mode hopping that increase mode partition noise.

The adverse effects of reflections can be partially reduced by using an optical isolator in front of the laser. However, use of an isolator does not solve problems of interferometric conversion of phase noise into intensity noise and the crosstalk in bidirectional systems. Therefore, to further improve system performance, the return loss of index discontinuities must be improved.

Terminology to describe return loss in the trade can be confusing. Good system performing achieved through minimizing unwanted reflections is sometimes termed "low return loss" whereas in fact it is desirable that the loss in the "returned" signal be high to minimize adverse effects. The term "good" is used herein rather than "low" or "high", meaning a return loss that is a large negative figure.

The Fresnel loss in decibels (dB) for two fibers separated by a small gap is:

$$Loss\ (ref.) = 10\ \log_{10}(1-p)$$

where p is the reflection coefficient:

$$p = \frac{n_1 - n_0^2}{n_1 + n_0}$$

Figure 2A:
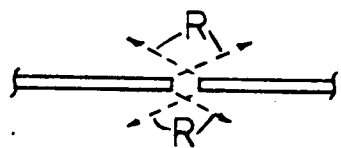
FIG. 2 (a) shows two optical fibers in a butt-coupled configuration, with dashed lines to show the cone of light emitted (the numerical aperture), thereby suggesting the high loss associated with end-separation.
Figure 2B:
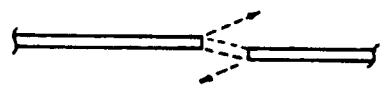

The Fresnel loss may be reduced by replacing the air in the gap between the fiber ends with a material having a refractive index closer to that of the fiber. In the case of air, and multimode fibers, the Fresnel loss is about 0.32 dB, even with perfect alignment of the fibers in all degrees of freedom, and with the air gap reduced to a minimum. The effect is much more dramatic as the air gap increases. As seen in FIG. 2 (a) the optical signal is depicted as a conical ray, delineated by the rays R. Much of the signal is lost, as depicted by the diverging rays, rather than coupled into the opposite fiber. As the gap between the fiber ends increases the coupling loss will be greater, as shown graphically in FIG. 6 (a) for three different numerical apertures (NA).

It should be noted that the separation gap, which can be made very small in non-rotating connectors or splices, must be greater in rotary joints to ensure that there will be no contact between the fibers, which would scratch or crack the surfaces and lead to a large increase in loss.

Many of the problems associated with air gap losses in FORJ's can be avoided by filling the gap with an index-matching fluid having the following properties:
a) High transmission (transparency) at all commonly used wavelengths, e.g. 850, 1300 and 1550 nm.
b) Stable over temperature range of at least −40° C. to +65° C.
c) Amenable to the removal of air and moisture (for fluid filling under vacuum).
d) Compatible chemically with commonly used metals (stainless steel, aluminum, brass, mild steel) and other materials (Delrin®, rare earth magnets, glass, acrylate, "Buna N").
e) Highly incompressible (like water).
f) Not volatile or otherwise dangerous to handle.

Fluids that have been found to be candidates include silicon oil SF96 supplied by General Electric Co. Fluorinert® FC70 supplied by 3M Company may be a candidate for some applications but has rather poor low temperature properties. Other oils found to be less suitable include various types of glycerin, mineral oil and paraffin oil.

Figure 1:
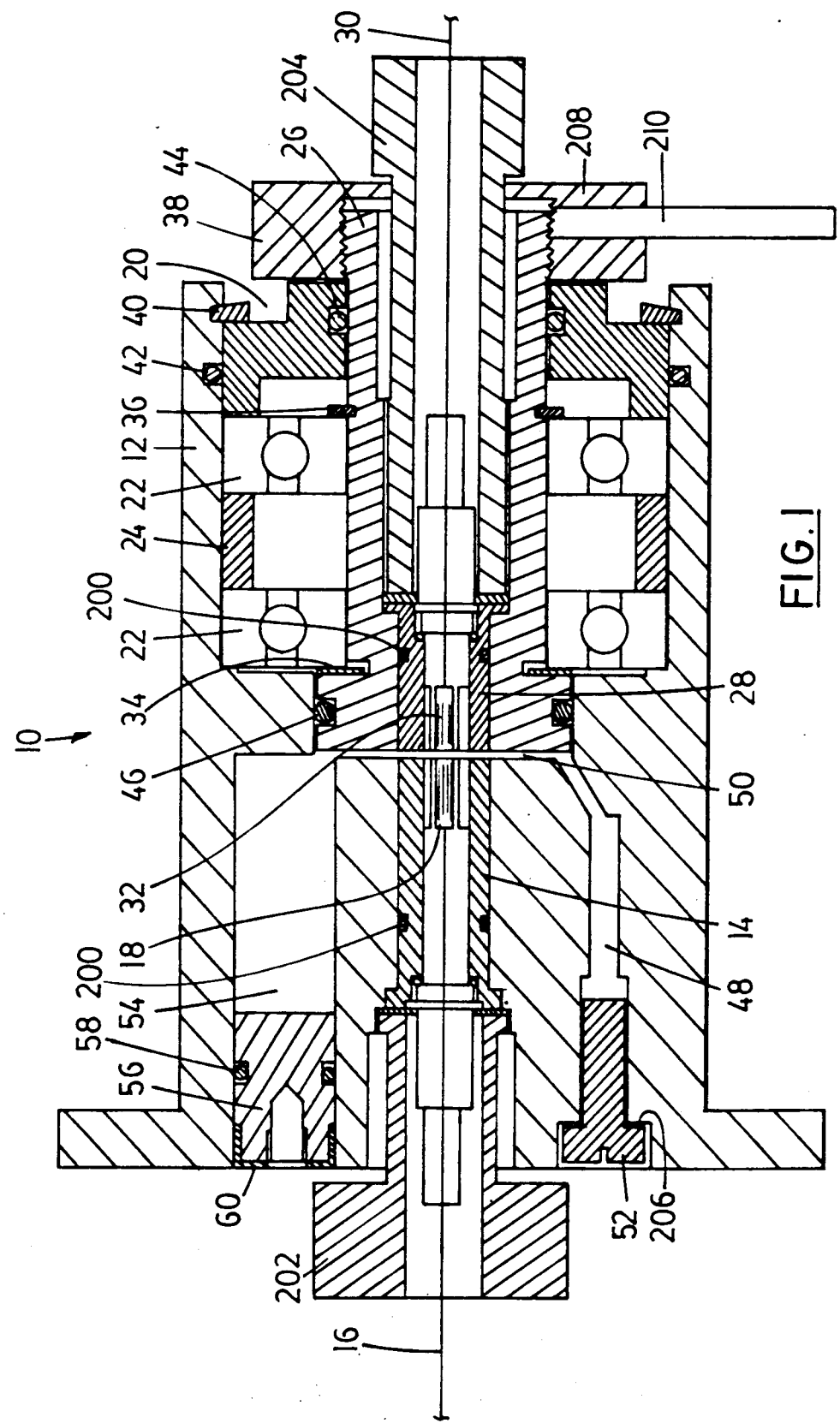
FIG. 1 shows one embodiment of the invention. It utilizes graded index rod lenses to achieve expansion and collimation of the beam of light between the rotating and stationary fibers, and a sealed area in the vicinity of the lenses to contain the index-matching oil.

FIG. 1 shows in general cross-section a FORJ 10 using singlemode fibers and constructed so as to utilize an index-matching fluid between the ends of the fibers. Generally speaking, the FORJ has a non-rotational housing or stator 12 in which an on-axis ferrule 14 is mounted, the ferrule in turn mounting an optical fiber 16 and a graded-index (GRIN) rod lens 18 in a conventional manner. The ferrule 14 is held in place by threaded nut 202. The stator 12 has an axial bore 20 containing a pair of annular bearings 22 separated by an annular spacer 24. The bearings 22 support a rotor 26 for rotation within the bore 20.

The rotor 26 mounts an on-axis ferrule 28 which, in turn, mounts an optical fiber 30 and a graded-index (GRIN) rod lens 32 in a conventional manner. Threaded nut 204 holds the ferrule 28 in place. Circlips 34,36 mounted in circumferential recesses in the rotor position the rotor in relation to the bearings 22 and an annular end piece 38 surrounds the rotor and holds the bearings, and hence the rotor, in place within the bore 20 due to the effects of the annular wedge or taper ring 40 received in a complementary recess within the stator 12.

The spacing between the lenses 18 and 32 is maintained by the engagement of annular shoulders or ferrules 14 and 28 with matching annular surfaces in the stator 12 and rotor 26 respectively.

Annular seal members, such as 0-rings 42,44 seal the end piece 38 with respect to the bore 20 and the rotor 26 to prevent lubricating fluid or debris from entering the bore 20 around the rotor. An annular seal member, such as 0-ring 46 seals the inner end of the rotor 26 with respect to the bore 20 to prevent debris or contamination in lubricating oil surrounding the bearings and the rotor from passing towards the lens 18.

Similarly annular seal members such as O-rings 200 prevent the entry of contaminants, or the loss of index-matching fluid, between the ferrules 14 and 28 and the stator 12 and rotor 26 respectively.

The stator 12 is provided with an axially extending bore 48 which communicates with the gap 50 between the inner ends of the ferrules 14,28 that being the gap between the opposing end faces of the GRIN lenses 18,32. An end plug member 52 is threadedly and sealably received in the bore 48. The seal is shown as a gasket 206 but could also be an 0-ring.

The gap 50 also communicates with a pressure compensation bore 54 containing a freely movable compensation piston 56 which is sealed with respect to the bore wall by annular seal means, such as 0-ring 58. A threaded cap member 60 closes the outer end of the bore 54, not sealably, and provides an abutment or seat for the piston 56 should it reach the limit of its travel.

The threaded nut 208 provides a means to attach the torque rod 210 which in turn connects to the rotating part of a winch or other apparatus into which the FORJ is mounted.

The present invention reduces the problem of losses by containing an appropriate index-matching fluid within the interface zone between the rotor and stator lenses 18,20. The fluid is introduced via the bore 48 to fill that bore, the gap 50, the bore 54 and related capillaries. The fluid is contained by the plug 52 and the piston 56.

The procedure for oil filling must be done carefully, to avoid bubbles of entrapped air which could subsequently reach the optical path and increase the loss by acting as lenses and thereby directing light away from the desired path as well as contributing to Fresnel loss. The oil is first of all placed in a vacuum chamber until there is no evidence of escaping air bubbles. The oil is agitated gently and continuously at an elevated temperature while it is within the vacuum chamber. Then the oil, in the vacuum chamber, is introduced into the joint by way of the bore 48 to fill the bore 54, gap 50 and bore 48. Then the plug member 52 is threaded into the bore to seal it from the atmosphere.

Although the oil is selected to have a thermal expansion coefficient that is as compatible as possible with the other materials of the FORJ there is a possibility of variations in oil volume induced by temperature and/or pressure variations, compensation therefor being achieved by the compensation piston 56.

Figure 6A:
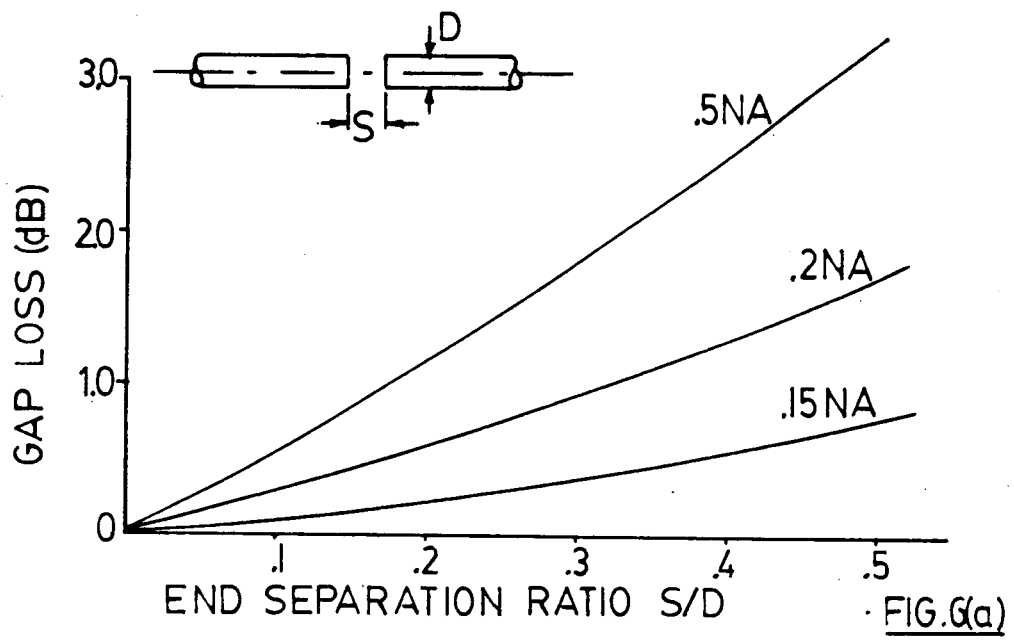
FIG. 6 (a) shows the end-separation loss with butt-coupled fibers.
Figure 6B:
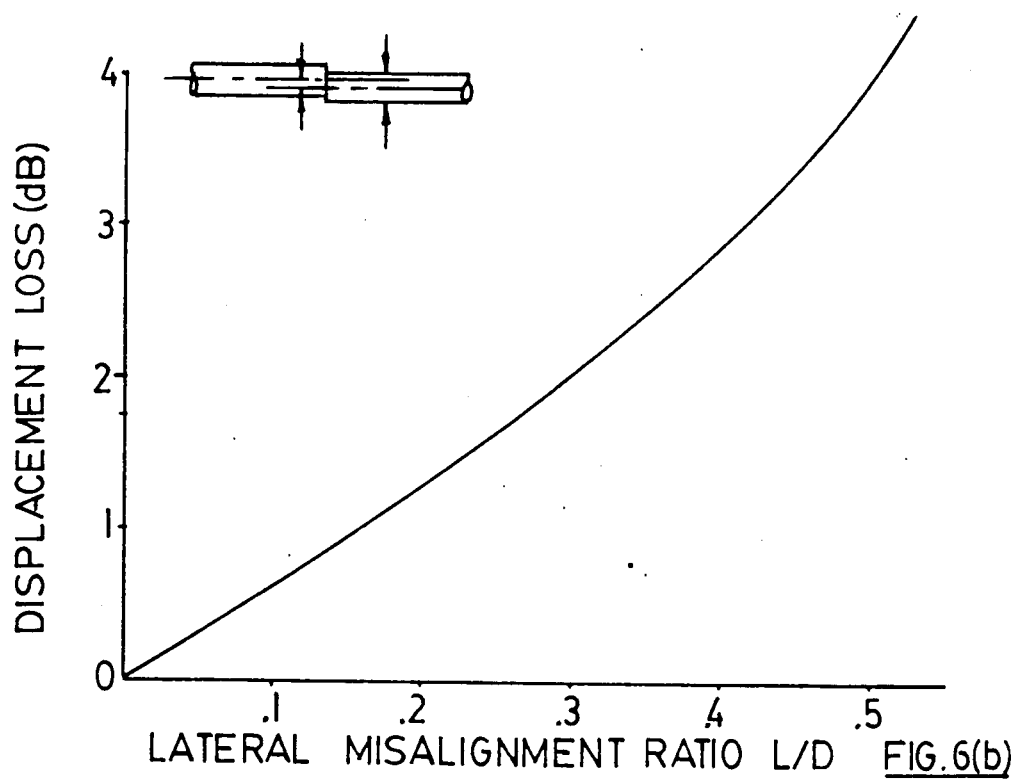

Concentricity of the rotor and stator is important so as to avoid losses occasioned by lateral offset as depicted in FIG. 2 (b) wherein much of the light is not transmitted from one fiber to the other. FIG. 6 (b) shows this loss graphically. With the present invention the bearings 22,22, the seals 42,44,46 and the mechanical tolerances of the components all contribute to centering the rotor 26 in the stator 12. The result is an assembly that is capable of giving good insertion loss (less than 3 dB) and low return loss (less than −24 dB) with singlemode fibers and lenses.

(b) ANGLED FACETS

When used in conjunction with an index-matching fluid, angled facets (i.e. oblique end faces) of the optical elements can give the best possible return loss performance. FIG. 4 (c) shows a fiber 70 and rod lens 72 having angled facets 74,76 respectively and a droplet 86 of fluid between them; FIG. 4 (d) shows two rod lenses 78,80 with angled facets 82,84 respectively and a droplet 86 of fluid between the faces.

Return loss performance is thereby improved by avoidance of planar facets perpendicular to the axis. Any light reflected from the angled facet is lost rather than transmitted back to the emitter. It is evident that a good refractive index match is essential to avoid refraction at the interfaces between the optical elements and the fluids, as such refraction would cause a loss in the light signals.

Another alternative to angled facets is curved or concave facets such as are shown in FIG. 4 (e) wherein lenses 88,90 have spherically, or parabolically, concave end facets 92,94. If desired, a droplet of index-matching fluid (not shown) could be provided between the lenses, as in FIG. 4 (d).

Fiber tapers are also candidates for use with angled facets in that, like rod lenses, the light is collimated within the lens before exiting. This is in contrast to the curved lenses of FIG. 3 (b), 3 (c) or 4 (b), which rely on a refractive index mismatch as the light exits the lens to achieve collimation, and are intrinsically less prone to return loss problems through the absence of planar perpendicular faces.

(c) SINGLEMODE FIBER

Figure 3A:
FIG. 3 (a) shows the addition of singlemode gradedindex (GRIN) rod lenses, to achieve both expansion and collimation of the light beam, the same function served by the GRIN lenses in FIG. 1.
Figure 3B:
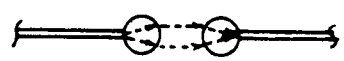
Figure 3C:
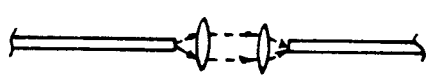
Figure 4E:
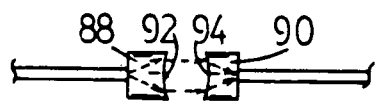
FIG. 4 (a) shows optical fiber tapers, achieving expansion of the light beam and, thereby, reduced loss due to lateral misalignment.
Figure 4A:
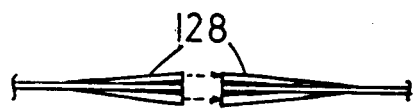
Figure 4B:
Figure 4C:
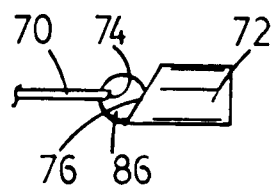
Figure 4D:
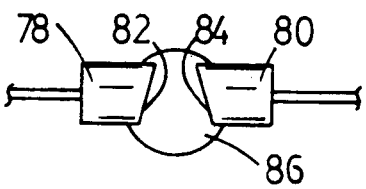

Previous U.S. Pat. Nos. (4,398,791; 4,641,915; and 4,725,116) incorporating graded index (GRIN) rod lenses have been limited to multimode fiber as evidenced by the exclusive references to ray tracing, "parallel" beams etc., referring to simplifications of the Maxwell wave equations that are applicable only to transmission in multimode fiber. In FIGS. 2, 3 and 4 we have adopted this type of simplification for purposes of clarity in demonstrating factors affecting optical performance. To analyze performance with singlemode fiber, the appropriate electromagnetic field theory is required. Before proceeding with this analysis, a short review of singlemode fiber as opposed to multimode is given.

Maxwell's equations show that light does not travel randomly through a fiber but rather is channelled into modes, which represent the allowed solutions to the electromagnetic field equations. The characterization of light propagation as rays is inexact and not adequate to describe singlemode propagation.

In singlemode fiber, the core diameter is wavelength dependent and is reduced to less than 10 =m at the wavelength of 1300 nm commonly used in telecommunication systems. The result is that only a single mode, or solution to the Maxwell equations, propagates effectively.

The modes or fields of singlemode fibers are nearly Gaussian in shape, as shown by Marcuse (reference 5). This permits simplification of analysis of coupling efficiencies in connectors or rotary joints, relative to the complicated Bessel and modified Hankel functions which rigorously define the modal field pattern; it is possible now to analyze losses between two Gaussian beams misaligned in tilt, offset or end-separation. The width or beam-waist of the Gaussian field distribution of a given fiber can be more simply expressed, and the coupling efficiency calculated as the overlap integral of the mode profiles of the rotating and stationary fibers.

Singlemode fibers are used almost exclusively in long-haul telecommunications, due mainly to their low loss and high bandwidth, and may displace multimode fiber even in local area networks. This trend was limited by the need for connectors, which are more demanding in singlemode systems due to the submicron alignment accuracies imposed by the small core diameters.

The closer precision demanded by singlemode fiber optic systems relative to multimode is demonstrated in FIG. 7, which schematically illustrates a system for achieving accurate mounting of singlemode lenses 96 in ferrules 98. The same type of setup can be used to mount fibers to lenses and to control accurate machining of mating parts. The procedure is to inject laser light from a source 100 into a fiber 102 and thence into the lens 96. The light beam 104 is picked up by a vidicon camera 106, the signal from which is digitized 108 and passed to a microcomputer 110. By viewing the image on the monitor 112, the operator can optimize the lens position via the D to A converter 114 and precision positioner/controller 116, thereby adjusting the angle (Θ) and translational position (x,y) of the lens. The other control components are the stepper motor 118 and pivoting coupler 120. The process can readily be automated. Once the position is correct, the injector 121 places epoxy in the ferrule 98 which is maintained in position by precision bearings 122.

Expanded-beam lenses are available for singlemode components as well as for the more conventional multimode systems addressed by the above-mentioned patents. FIG. 3 (a) shows graded-index (GRIN) rod lenses such as those marketed by Nippon Sheet Glass under the tradename "Selfoc". This is the type of lens used in the assembly of FIG. 1. The pattern of beam expansion, collimation and subsequent contraction back into the opposite lens, for the simpler multimode case, is shown. FIG. 3 (b) shows spherical lenses, doing the same function of beam expansion, collimation and refocusing. FIG. 3 (c) shows conventional double-convex lenses serving the same purpose, again showing ray-tracing to simplify the understanding of the light propagation.

The expanded beam in the singlemode case is not as large as that in the multimode case (typically 1 mm vs. 2.5 mm), due to the smaller numerical aperture (NA) of singlemode fiber. To achieve consistent results in a rotating assembly, care is required with the mechanical assembly and the bearings as discussed in section (f). The resulting assembly is relatively tolerant to end-separation and lateral offset between the beams, and intolerant to relative tilt; however, tilt is more easily controlled in the mechanical assembly, such as FIG. 1 or FIG. 5.

(d) TAPERED FIBERS

The use of optical fiber tapers, which have recently become commercially available (references 1, 2, 3), obviates the need for lenses to expand the optical beam. As shown in FIG. 4 (a), the tapers 128 expand the beam in much the same manner as do GRIN, spherical or convex lenses. By avoiding the fiber-to-lens interface that is present in any lensed system, the use of tapers avoids a source of reflection that leads to return loss. This is most advantageous in conjunction with singlemode fiber as discussed earlier, because the performance of laser transmitters used in singlemode systems is degraded by unwanted reflections. Return loss can be further improved by the use of index-matching fluid at the interface between the taper ends and even further by the use of angled or curved end-faces of the tapers as discussed earlier.

Fiber tapers can be either multimode or singlemode. They are most advantageous in singlemode systems because the beam is more nearly collimated, thereby minimizing end-separation loss (per FIG. 6 (a)), and because the improvement in return loss is most significant in conjunction with the laser transmitters used with singlemode fiber.

Fiber tapers have further advantages. They are aberration-free, unlike lenses; they avoid the need for precise mounting of the expanded-beam lens to the fiber; furthermore, they are not as prone to tilt-induced loss as are systems using expanded-beam lenses, as the expansion ratio can be chosen to keep the angular tolerance well within acceptable limits.

Typical optical fiber taper construction maintains the same refractive index profile as the cross-section increases to the larger size from that of the fiber. Gradual enlargement has the effect of increasing the dimension of the dominant mode beam. By retaining a step-index profile, as opposed to more parabolic profiles, the beam expansion is optimized (reference 1).

Whereas the singlemode tapers discussed above actually involve an increase in the physical dimensions of the fiber to achieve beam expansion, an alternative method (reference 4) involves heating the fiber, thereby changing the refractive index profile by diffusion of the dopant, typically fluorine The change in the index profile locally broadens the beam, i.e. the mode field radius, while keeping the mechanical dimension of the fiber unchanged.

(e) ASPHERIC LENSES

Eastman Kodak Company developed the moulded glass aspheric lens for a singlemode connector termed "Lamdek". This type of lens, shown in FIG. 4 (b), can be adapted to rotary joints, taking the place of the graded-index, spherical or convex lenses. For some applications including singlemode they give superior beam expansion and collimation and hence reduced dependency on mechanical precision.

The performance of the aspheric lenses, like that of most lenses, can be enhanced by the addition of anti-reflection coatings which improve the return loss.

Like spherical lenses, aspheric lenses have a disadvantage compared to lenses or tapers having flat end faces perpendicular to the axis (such as graded index rod lenses or fiber tapers), namely that the collimation achieved is dependent on the refractive index of the medium between the lenses. This means that, if the assembly is to be fluid-filled, the fluid must have a refractive index near that of air, which is difficult to achieve; or alternatively, if a fluid having a refractive index between those of the lens and of air is used, that the radius of curvature of the refractive face of the lens be changed accordingly.

(f) TAPERED BEARINGS

The use of plain taper bearings as shown in FIG. 5 eliminates relative motion or "slop" between the bearing and housing, thereby achieving improved concentricity between the rotating and stationary elements. This is essential for use with the small core diameters of singlemode fiber. Equally importantly, the enhanced concentricity achieved by taper bearings prevents any significant variation in loss with rotational position, so that the optical flux is nearly constant, optimizing performance and easing the receiver dynamic range requirements.

FIG. 5 illustrates a FORJ 130 comprising a stator 132 having an axial bore 134 in which a ferrule 136 mounting a GRIN lens 138 and an optical fiber 140 is secured in a conventional manner. The stator 132 has a machined frustoconical bearing surface 142 opening outwardly from the lens 138. A rotor 144 has an axial bore 146 in which a ferrule 148 mounting a GRIN lens 150 and an optical fiber 152 is secured in a conventional manner. The rotor has a machined frustoconical bearing surface 154 which mates with the surface 142 and allows the lenses 138,150 to be close together when the rotor and stator are positioned as shown. The bearing surfaces 142,154 may be coated with a slippery material such as TEFLON (trade mark) or they may be lubricated by an oil which also serves as an index-matching fluid to reduce losses between the lenses 138,150. If an oil is used then seals analogous to those shown in FIG. 1 would be provided, together with the associated filling port, plug pressure compensation chamber, and piston.

The rotor is held in position by an annular end cap 156 which traps a thrust bearing 158 between itself and the rotor 144, axial pressure on the bearing being provided by a preload washer 160. The end cap is threaded onto the stator as shown at 162.

Although the lenses 138,150 are illustrated as being GRIN rod lenses it is understood that any of the other types of lenses discussed herein could be utilized in this embodiment.

The use of precision sleeve bearings can also provide the desired concentricity required for singlemode assemblies, but is more demanding of close mechanical tolerances or custom fits in the mechanical parts.

REFERENCES

1. Presby, H.M. et al., "Optical Fiber Up-Tapers with High Beam Expansion Ratios for Component Fabrication", J. Lightwave Technology, Volume 7, No. 5, May 1989.
2. Presby, H.M. et al., "Research on an Expanded Beam Singlemode Fiber Optic Connector", Applied Optics, Volume 27, No. 15, Aug. 1988.
3. Amitay, N. and Presby, H.M., "Optical Fiber Up-Tapers Modeling and Performance Analysis", J. Lightwave Technology, Volume 7, No. 1, Jan. 1989.
4. Harper, J.S. et al., "Singlemode Core-Diffused Tapers for Interconnection Components", SPIE Volume 988, 1988.
5. Marcuse, D., "Loss Analysis of Single-Mode Fiber Splices", The Bell System Technical Journal, Volume 56, No. 5, May - June 1977.

THE EMBODIMENTS OF THE INVENTION IN WHICH AN EXCLUSIVE PROPERTY OR PRIVILEGE IS CLAIMED ARE DEFINED AS FOLLOWS:

1. A fiber optic rotary joint for use with singlemode optical fibers comprising: a stator member; means for axially mounting a first singlemode optical fiber and first light beam expanding and collimating means in said stator member; a rotor member bearingly mounted in said stator member for rotation relative thereto; means for axially mounting a second singlemode optical fiber and second light beam expanding and collimating means in said rotor member; means establishing a sealed zone between said rotor and stator members, which zone includes an optical path between said first and second light beam expanding and collimating means; and an optically transmissive fluid contained within said sealed zone.

2. The rotary joint of claim 1 wherein said sealed zone establishing means comprises rotary seal means between said rotor and stator members, a fluid fill port in said stator member communicating with said sealed zone, and a plug member releasably and sealingly received in said fill port.

3. The rotary joint of claim 2 including a pressure compensation chamber in said stator member communicating with said sealed zone, a freely movably pressure compensating piston within said chamber, and a non-sealed cap member for preventing the piston from exiting said chamber should it reach the end of its travel.

4. The rotary joint of claim 3 wherein said fluid matches the index of refraction of said light beam expanding and collimating means.

5. The rotary joint of claim 1 including a pair of bearing members supporting said rotor member within an axial bore of said stator member, an annular spacer member spacing said bearing members apart, an annular end cap surrounding said rotor member, a pair of annular sealing rings sealing said end cap to said bore and said rotor member respectively, and an annular resilient wedge member received in a peripheral groove in said bore and bearing against said end cap.

6. The rotary joint of claim 1 wherein said light beam expanding and collimating means comprise graded index rod lenses.

7. The rotary joint of claim 1 wherein said light beam expanding and collimating means comprise aspheric lenses.

8. The rotary joint of claim 1 wherein said light beam expanding and collimating means comprise spherical lenses.

9. The rotary joint of claim 1 wherein said light beam expanding and collimating means comprise optical fiber tapers.

10. The rotary joint of claim 6 wherein said rod lenses have opposing end facets that are plane, angled or curved relative to the axis of said joint.

11. The rotary joint of claim 9 wherein said optical fiber tapers have opposing end facets that are plane, angled or curved relative to the axis of said joint.

12. A fiber optic rotary joint for use with singlemode optical fibers comprising: a stator member; means for axially mounting a first singlemode optical fiber and first light beam expanding and collimating means in said stator member; a generally frustoconical first bearing surface in said stator member, opening outwardly away from said first light beam expanding and collimating means; a rotor member having a second generally frustoconical bearing surface matable with said first bearing surface; means for axially mounting a second singlemode optical fiber and second light beam expanding and collimating means in said rotor member; an end cap releasably secured to said stator member; and thrust bearing means between said end cap and said rotor member.

13. The rotary joint of claim 12 including lubricating means between said first and second frustoconical bearing surfaces.

14. The rotary joint of claim 12 wherein said light beam expanding and collimating means comprise graded index rod lenses.

15. The rotary joint of claim 12 wherein said light beam expanding and collimating means comprise aspheric lenses.

16. The rotary joint of claim 12 wherein said light beam expanding and collimating means comprise spherical lenses.

17. The rotary joint of claim 12 wherein said light beam expanding and collimating means comprise optical fiber tapers.

18. The rotary joint of claim 14 wherein said rod lenses have opposing end facets that are plane, angled or curved relative to the axis of said joint.

19. The rotary joint of claim 17 wherein said optical fiber tapers have opposing end facets that are plane, angled or curved relative to the axis of said joint.

20. The rotary joint of claim 12 including an index-matching fluid between said bearing surfaces and said first and second light beam expanding and collimating means.

21. A fiber optic rotary joint for use with multimode optical fibers comprising: a stator member; means for axially mounting a first multimode optical fiber and first light beam expanding and collimating means in said stator member; a generally frustoconical first bearing surface in said stator member, opening outwardly away from said first light beam expanding and collimating means; a rotor member having a second generally frustoconical bearing surface matable with said first bearing surface; means for axially mounting a second multimode optical fiber and second light beam expanding and collimating means in said rotor member; an end cap releasably secured to said stator member; and thrust bearing means between said end cap and said rotor member.

22. A fiber optic rotary joint for use with single mode optical fibers, comprising; a stator member; first and second single mode optical fibers each having a core diameter for effectively propagating light in only a single mode; means interconnecting said first single mode optical fiber and a first light beam expanding and collimating means and for mounting said first fiber and said first expanding and collimating means in axial alignment in said stator member; a rotor member mounted to said stator member for rotation relative thereto; means interconnecting said second single mode optical fiber and a second light beam expanding and collimating means and for mounting said second fiber and said second expanding and collimating means in said rotor member; means establishing a sealed zone between said rotor and stator members, which zone includes an optical path between said first and second light beam expanding and collimating means; and an optically transmissive fluid contained within said sealed zone.

* * * * *